United States Patent
Shearer et al.

(10) Patent No.: US 9,150,162 B2
(45) Date of Patent: Oct. 6, 2015

(54) PORTABLE BICYCLE CARRIER SYSTEM FOR AUTOMOBILES

(71) Applicants: Joshua Shearer, Mishawaka, IN (US); Eric Perrine, Fort Wayne, IN (US); Schuyler Putt, Fort Wayne, IN (US)

(72) Inventors: Joshua Shearer, Mishawaka, IN (US); Eric Perrine, Fort Wayne, IN (US); Schuyler Putt, Fort Wayne, IN (US)

( * ) Notice: Subject to any disclaimer, the term of this patent is extended or adjusted under 35 U.S.C. 154(b) by 0 days.

(21) Appl. No.: 13/743,020

(22) Filed: Jan. 16, 2013

(65) Prior Publication Data

US 2014/0197213 A1    Jul. 17, 2014

(51) Int. Cl.
B60R 9/10    (2006.01)
B60R 11/00   (2006.01)

(52) U.S. Cl.
CPC ........... B60R 9/10 (2013.01); *B60R 2011/0057* (2013.01)

(58) Field of Classification Search
CPC .................................. B60R 9/10; B60R 9/058
USPC ................ 224/309, 325, 575, 924, 429–430, 224/42.11, 546, 562, 318, 329, 324; 211/17–22
See application file for complete search history.

(56) References Cited

U.S. PATENT DOCUMENTS 6,446,850 B2 *    9/2002   Ming-Shun ................. 224/324

FOREIGN PATENT DOCUMENTS

EP              719676 A1 *    7/1996
WO    WO 2008099386 A1 *    8/2008

* cited by examiner

*Primary Examiner* — Justin Larson
*Assistant Examiner* — Phillip Schmidt
(74) *Attorney, Agent, or Firm* — Jacque R. Wilson, Esq.; Carson Boxberger LLP

(57) ABSTRACT

A removable, portable, carrier system for the transportation of a human powered vehicle on the exterior of a motorized vehicle, said carrier system comprises: a first independent means for releasably securing the handles of the human powered vehicle to the exterior of said motorized vehicle, and a second, independent means for releasably securing the seat of the human powered vehicle to the exterior of said motorized vehicle.

7 Claims, 7 Drawing Sheets

PORTABLE BICYCLE CARRIER SYSTEM FOR AUTOMOBILES

BACKGROUND

1. Field of the Invention

The present invention relates to a bike carrying device, and more particularly to a portable bike carrying device for use with a wheeled or other motorized vehicle, such as a car, a van, a truck, a train, a boat, an ATV or the like.

2. Description of the Related Art

It is well known to carry objects such as bicycles on the roof of vehicles such as cars by means of a roof rack. Roof racks come in many varieties; however, they usually include a rack and an attachment means for securely and releasably mounting the rack to the roof of the car. The roof rack attachment means may comprise a series of adjustable straps which secure the roof rack onto the roof rack of the car. These straps are usually provided with hooks and usually attach to the door jams of the car. In some types of roof racks, the attachment means comprises a series of suction cups which secure the roof rack member to the roof of the car by suction. The roof rack attachment means may also comprise a combination of suction cups and straps.

The geometry of the rack portion of the roof rack varies depending on the type of objects to be mounted, but typically the rack consists of several longitudinal beams arranged in parallel to extend transversely across the roof of the car. The beams may be provided with bumper pads on their underside which bear against the car roof to provide support. The bumper pads may be made of rubber or plastic and in some cases may comprise suction cups. The straps (where straps are used as the attachment means) usually comprise a long strap mounted to the end of each of the beams. The lengths of the straps are usually adjustable to tighten the beams onto the roof. When the rack is mounted in place on the vehicle roof, the ends of the beams are positioned at either side of the car. Elastic cords (such as bungee cords) or straps are usually used to secure the object to the beams. In some cases the beams have special projections for providing convenient attachment points for the bungee cords, while in other cases the beams are provided with clamps for securing specific objects such as skis.

Certain roof racks are designed and dedicated for carrying specific objects. Racks designed for carrying bicycles for instance often have a plurality of straps and beams for rigidly securing the frame of the bicycle so that it will not move during transport. The beams usually include special slots for receiving the wheels of the bicycle.

Thus, one of the major drawbacks associated with many of these prior art bike rack designs is that they are relatively difficult and inconvenient to assemble, thereby making the process of installation undesirably time-consuming and difficult. Consequently, once a conventional bicycle rack is installed, it is often left in place, which can leave the vehicle difficult to park, wash, or otherwise maintain. Moreover, the rack itself may be damaged.

An additional problem with prior art bicycle racks is that the size and weight of such devices requires that they be assembled and placed on a vehicle in anticipation of the need to transport a bicycle. Thus, a cyclist cannot carry a portable bike rack that can be used as needed to transport a bicycle. There is no solution for easily transporting a bicycle using a bike rack where the need of the bike rack was sudden, such as when a rider is injured or becomes ill or when a ride must be ended early due to inclement weather.

There is therefore a need for a new and improved roof rack assembly that overcomes the drawbacks of prior roof rack assemblies.

SUMMARY

In order to address the outstanding needs in the field, the present invention provides a removable, portable, carrier system for transporting a bicycle on roof, trunk, hood or other exterior portion of a moving vehicle, such as a car, truck, bus, van or the like. The carrier system of the present invention comprises two flexible sleeves wherein each sleeve comprises opposing ends, each of which has a magnet for attaching the relevant sleeve to the car. Each sleeve further comprises at least one elongated, flexible strap for securing the sleeve to a bicycle.

DETAILED DESCRIPTION OF THE EMBODIMENTS

As stated previously, conventional bicycle racks and carrying devices as known in the prior art. However, prior art bicycle carrying devices are large, heavy, cumbersome, and typically challenging to assemble and attach to a motor vehicle.

Additionally, art bicycle racks is that the size and weight of such devices requires that they be assembled and placed on a vehicle in anticipation of the need to transport a bicycle. Thus, a cyclist cannot carry a portable bike rack that can be used as needed to transport a bicycle. There is no solution for easily transporting a bicycle using a bike rack where the need of the bike rack was sudden, such as when a rider is injured or becomes ill or when a ride must be ended early due to inclement weather. The present invention meets this need in the art.

Figure 1:
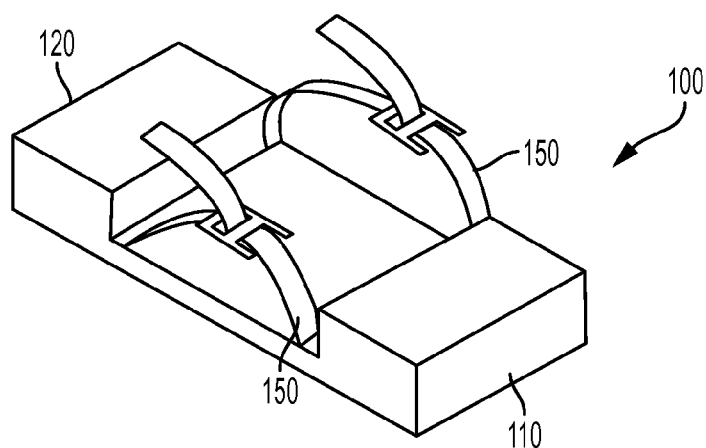
FIG. 1 is a top view of a carrier for securing a bicycle seat to a motor vehicle according to the present invention.
Figure 7:
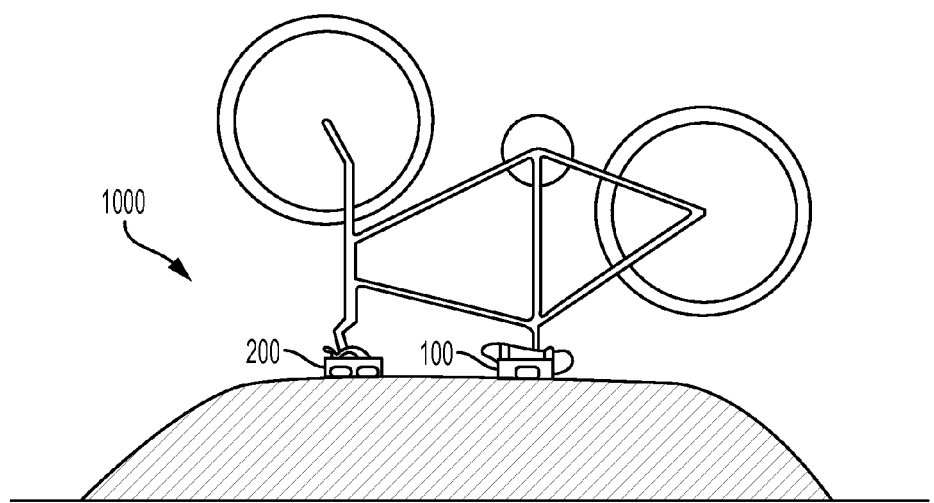
FIG. 7 is a side elevation view of the carriers of FIG. 1 and FIG. 4.

In one exemplary embodiment, the bike carrier system 1000 (FIG. 7) of the present invention comprises a first carrier sleeve 100 and a second carrier 200. As shown in FIG. 1, first carrier sleeve 100, adapted to secure the horn of a traditional bicycle seat, comprises a sheath having a first end 110 and a second end 120 and a rigid core. The sheath of first carrier 100 may be constructed of any material. However, it is desirable that the sheath comprises an inexpensive, durable, water resistant material. Sheath 100 may further comprise a rigid support member along its longitudinal axis.

Figure 2:
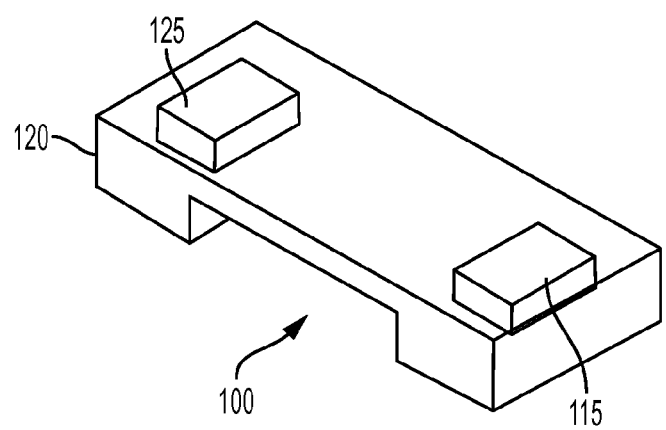
FIG. 2 is a bottom view of a carrier for securing a bicycle seat to a motor vehicle according to the present invention.

Referring now to FIG. 2, there is shown a bottom view of first carrier sleeve 100. Carrier sleeve 100 further comprises a first means for releasably attaching carrier sleeve 100 to a vehicle, such as a car, a bus, a van, a boat, an ATV, a train, or other vehicle. Generally, said vehicle is a motorized vehicle having a surface suitable for attaching carrier sleeve 100 using said means for releasably attaching carrier sleeve 100 to a vehicle. In one embodiment, this first means for releasably attaching carrier sleeve 100 to a vehicle preferably comprises a magnet 115 fixedly attached to end 110 of carrier sleeve 100.

Referring again to FIG. 2, there is again shown a bottom view of first carrier sleeve 100 having second end 120. Again, carrier sleeve 100 further comprises a second means for releasably attaching carrier sleeve 100 to a vehicle, such as a car, a bus, a van, a boat, an ATV, a train, or other vehicle. Generally, said vehicle is a motorized vehicle having a surface suitable for attaching carrier sleeve 100 using said second means for releasably attaching carrier sleeve 100 to a vehicle. In one embodiment, this second means for releasably attaching carrier sleeve 100 to a vehicle preferably comprises a magnet 125 fixedly attached to end 120 of carrier sleeve 100. In a preferred embodiment, straps 150 are made of nylon.

Although magnets 115 and 125 are the preferred means 151 for releasably attaching carrier sleeve 100 to a vehicle, the present inventors envision other means of releasable attachment, including: suction cups, adhesive, Velcro, or fasteners such as screws.

Referring again to FIG. 1, sheath 100 is preferably of rigid construction. However, in an alternative embodiment an optional stabilization member may be used. The stabilization member should be a rigid elongated piece comprised of any relatively strong durable, corrosion resistant, material, such as aluminum or stainless steel or a polymer.

As shown in FIG. 1, carrier sheath 100 further comprises flexible, straps 150 for releasably attaching a carrier sheath 100 to a bicycle seat (not shown). Straps 150 may be constructed of any suitably material for outdoor use and for sewing or otherwise permanently affixing strap 150 to carrier sheath 100.

In an exemplary embodiment, strap 150 comprises means for releasably tying opposing ends of said straps to one another. Said means may comprise a buckle, Velcro, a quick connect or other securing means.

Referring now to FIG. 2, there is shown a bottom perspective view of carrier sleeve 100. In an exemplary embodiment of the present invention, magnets 115 and 125 are arranged such that the respective poles of the magnets 115 and 125 face the same direction.

As shown in FIG. 1 and FIG. 2, carrier sheath 100 covers magnets 115 and 125 such that they do not scratch or otherwise damage the surface of a vehicle to which carrier sheath 100 may be attached.

Figure 3:
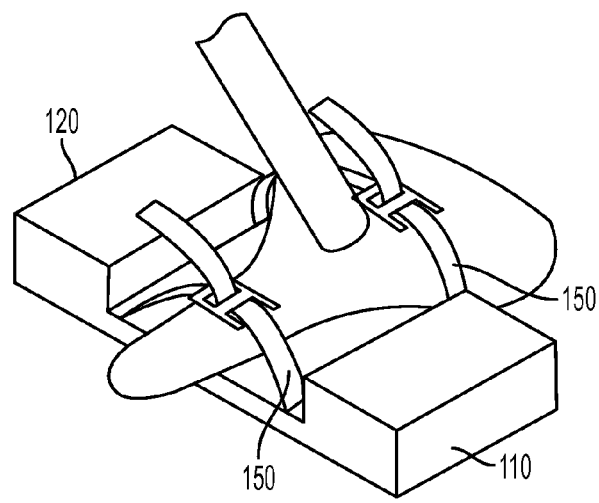
FIG. 3 is a top perspective view of the carrier of FIG. 1 in use.

Referring now to FIG. 3, there is shown a perspective view of carrier system 1000 in use, where it is shown that the horn of a standard bicycle seat is releasably connected to carrier sheath 100 via straps 150 by looping, or tying strap 150 around said bicycle seat. As shown in FIG. 3, the horn of a standard bicycle seat rests on the carrier sheath 100. Strap 150 is looped around the seat to releasably secure the bicycle seat to carrier sheath 100.

Figure 4:
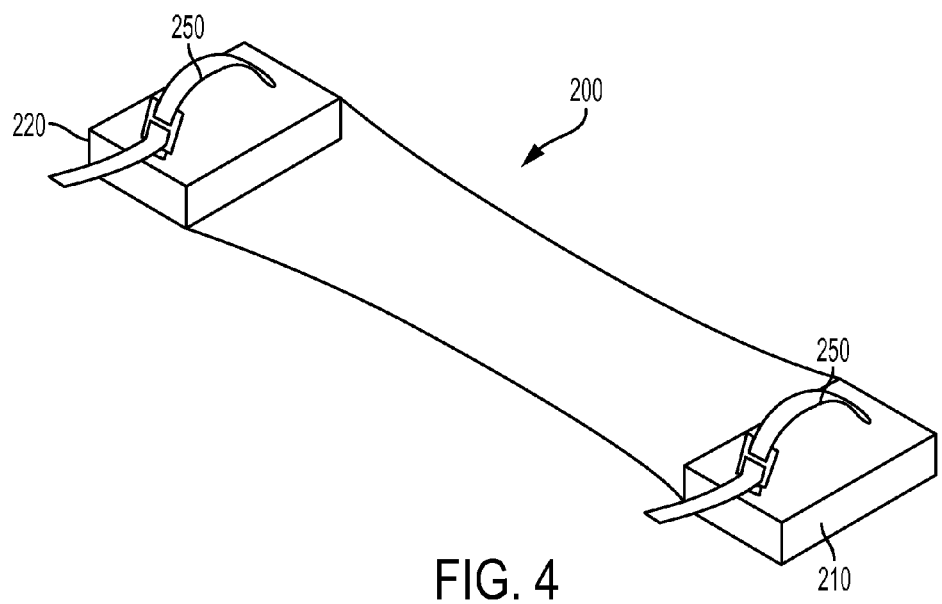
FIG. 4 is a top view of a carrier for securing a bicycle handlebar according to the present invention.

Referring now to FIG. 4, the bike carrier system 1000 of the present invention further comprises a second carrier 200. As shown in FIG. 4, second carrier sleeve 200, adapted to secure the handlebars of a traditional bicycle seat, comprises a flexible sheath having a first end 210 and a second end 220. The flexible sheath of second carrier 200 may be constructed of any desired material. However, it is desirable that the sheath comprises an inexpensive, durable, preferably water resistant material.

Referring again to FIG. 4, carrier sheath 200 further comprises flexible, straps 250 for releasably attaching carrier sheath 200 to a bicycle handlebar. Straps 250 may be constructed of any suitably material for outdoor use and for sewing or otherwise permanently affixing straps 250 to carrier sheath 200. Preferably, straps 250 are made of nylon and provided as a pair, with one strap at each end of carrier sheath 200.

Figure 6:
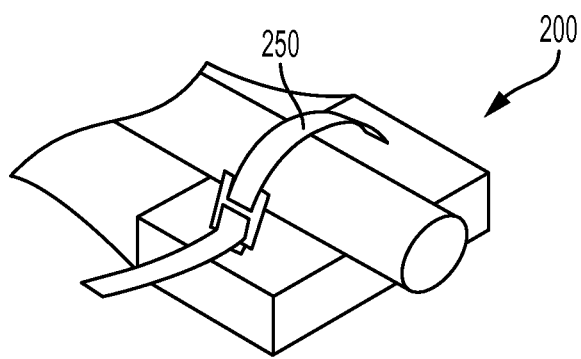
FIG. 6 is a top perspective view of the carrier of FIG. 4 in use.

Referring now to FIG. 6, there is shown a perspective view of carrier 200 in use, where it is shown that the handles of a standard bicycle are releasably connected to carrier sheath 200 via straps 250 by looping, or tying straps 250 around said bicycle handlebars.

Figure 5:
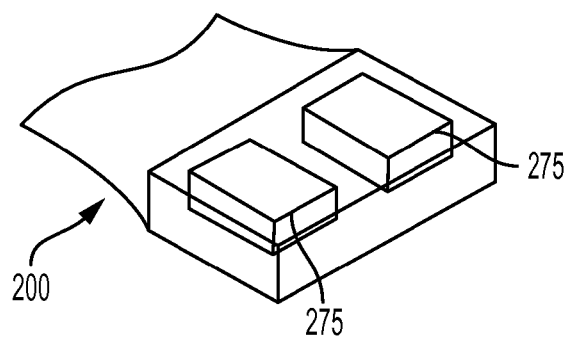
FIG. 5 is a bottom view of a carrier for securing a bicycle handlebar according to the present invention.

Referring now to FIG. 5, there is shown a bottom view of second carrier sleeve 200. Carrier sleeve 200 further comprises a means for releasably attaching carrier sleeve 200 to a vehicle, such as a car, a bus, a van, a boat, an ATV, a train, or other vehicle. Generally, said vehicle is a motorized vehicle having a surface suitable for attaching carrier sleeve 200 using said means for releasably attaching carrier sleeve 200 to a vehicle. In one embodiment, this means for releasably attaching carrier sleeve 200 to a vehicle comprises one or more magnets 215 fixedly attached to each end of carrier sleeve 200.

As shown in FIG. 5, magnets 215 are the preferred means for releasably attaching carrier sleeve 200 to a vehicle. However, the present inventors envision other means of releasable attachment, including: suction cups, adhesive, Velcro, or fasteners such as screws.

Referring again to FIG. 5, there is shown a bottom perspective view of carrier sleeve 200. In an exemplary embodiment of the present invention, magnets 215 and 225 are arranged such that the respective poles of the magnets 215 and 225 face the same direction.

As shown in FIG. 4 and FIG. 5, carrier sheath 200 covers magnets 215 and 225 such that they do not scratch or otherwise damage the surface of a vehicle to which carrier sheath 200 may be attached.

It should be understood that the above description is of a preferred embodiment and included for illustrative purposes only, and it is not meant to be limiting of the invention. A person skilled in the art will understand that variations of this invention are included within the scope of the claims.

We claim:

1. A removable, portable, carrier system for the transportation of a a human powered vehicle on the metal exterior of a motorized vehicle, said carrier system comprising
    a first independent flexible member for securing handlebars of the human powered vehicle to said motorized vehicle, said flexible member comprising a first end and a second end, said first end comprising at least one magnet for releasably attaching said independent flexible member to said motorized vehicle and at least one strap for releasably attaching said independent flexible member to one handlebar of said bicycle, said second end comprising at least one magnet for releasably attaching said independent flexible member to said motorized vehicle, said second end further comprising at least one elongated strap for releasably attaching said independent flexible member to a second handlebar of the human powered vehicle;
    said carrier system further comprising a second independent rigid body for releasably securing a seat of the human powered vehicle to the exterior of the motorized vehicle, said rigid body having at least one magnet disposed on a first side of the rigid body and at least two flexible straps disposed on said rigid body opposite said first side of said rigid body for releasably connecting said rigid body to the seat of the human powered vehicle; and the carrier system further comprising an elongated flexible portion disposed between said first independent flexible member and said second independent rigid body, said elongated flexible portion comprising no rigid infrastructure or superstructure.

2. The carrier system of claim 1, wherein the at least one strap of the independent flexible member is secured to the independent flexible member via a method selected from the group consisting of sewing, gluing, tying, heat fused, molding and threading.

3. The carrier system of claim 1, wherein one of the at least one straps is placed directly adjacent to the magnet such that the vertical component of a physical force applied to the strap is collinear or parallel with the direction of the north pole to south pole of the magnet.

4. The carrier system of claim 1, wherein the first independent flexible member and the second independent rigid body of the carrier system contain a plurality of magnets.

5. The carrier system of claim 4, further comprising a rigid connection between each magnet of the plurality of magnets.

6. The carrier system of claim 1, wherein the human powered vehicle is selected from the group consisting of a bicycle, a unicycle, tricycle, and a scooter.

7. The carrier system of claim 1, where in the motorized vehicle is selected from the group consisting system of an automobile, a train, a bus, a truck, a van, an ATV and a boat.

\* \* \* \* \*